Oct. 25, 1938.  O. SUTTER  2,134,216
SEED GRADING AND CLEANING APPARATUS
Filed Aug. 22, 1936   2 Sheets-Sheet 1
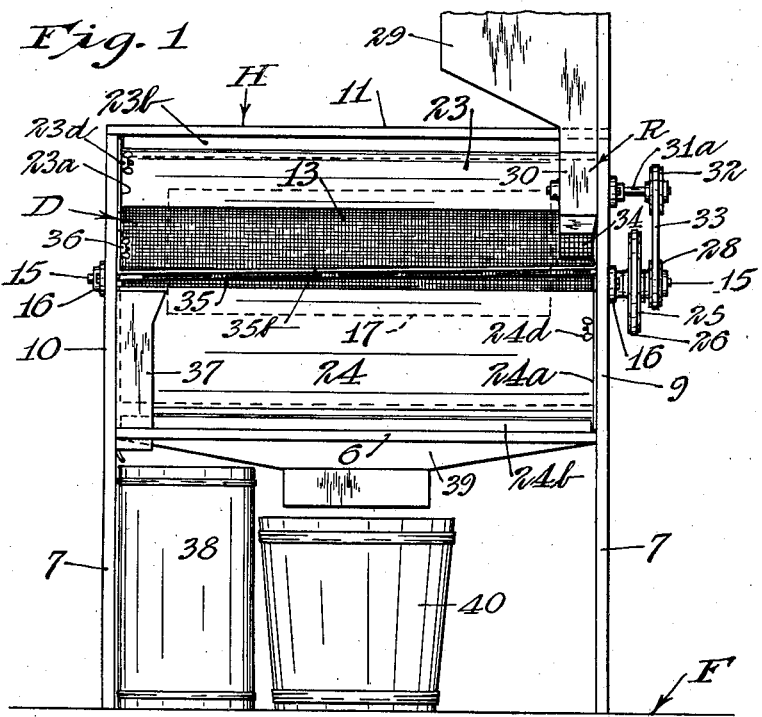
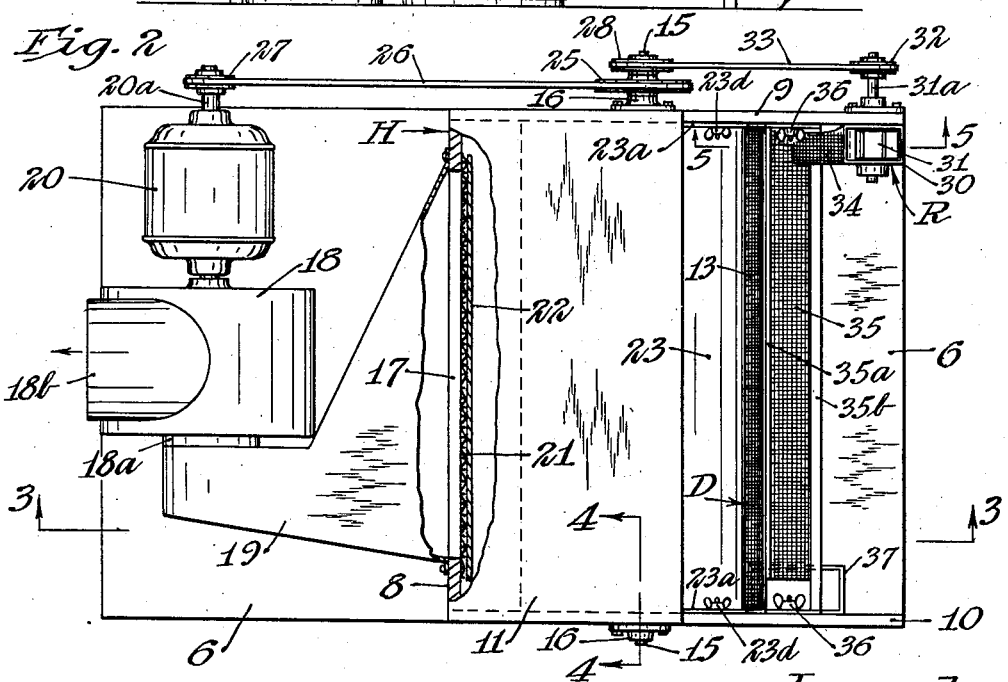
Inventor
Ole Sutter
By Williamson & Williamson
Attorneys Oct. 25, 1938.　　　　O. SUTTER　　　　2,134,216
SEED GRADING AND CLEANING APPARATUS
Filed Aug. 22, 1936　　　2 Sheets-Sheet 2
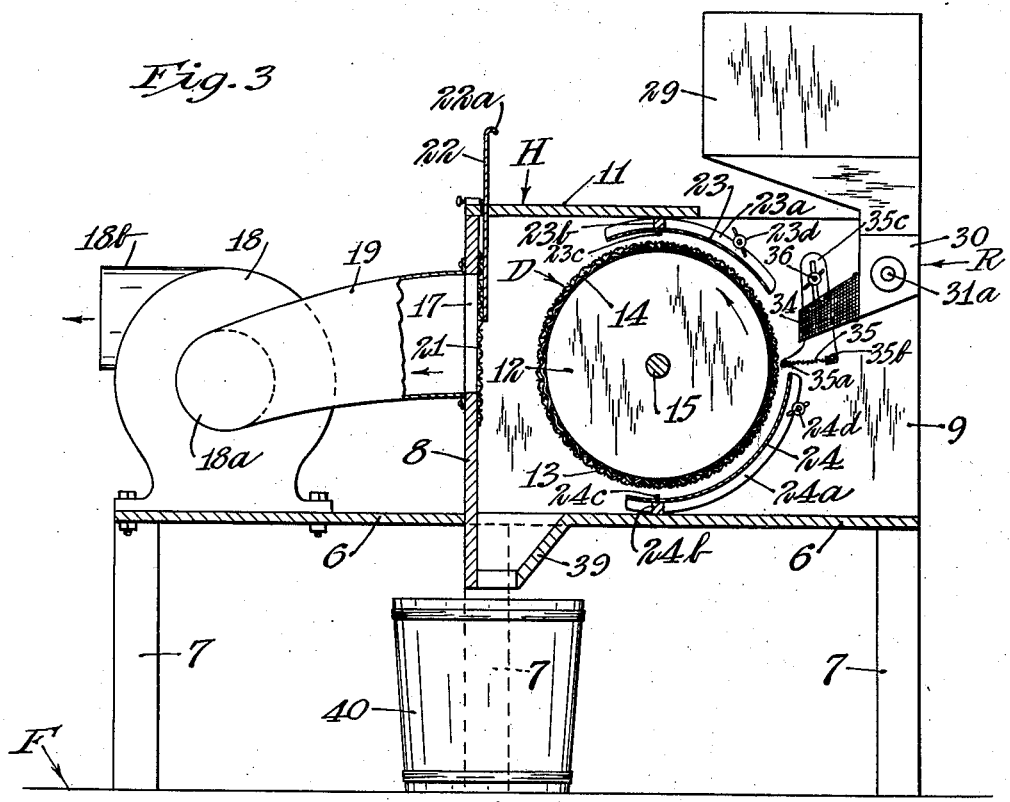
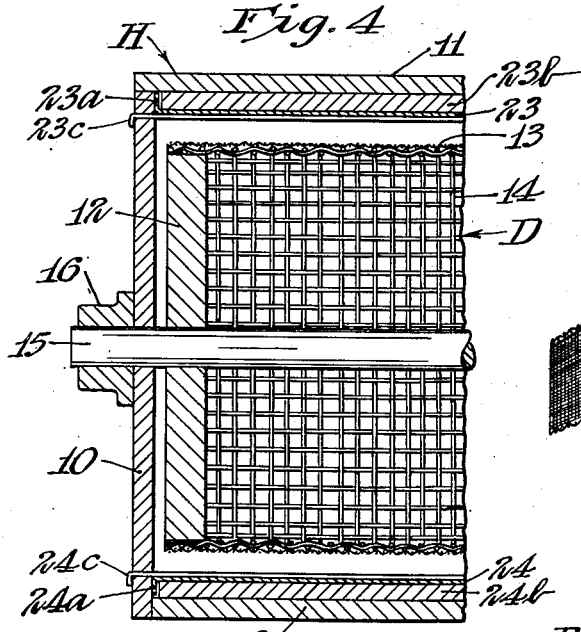
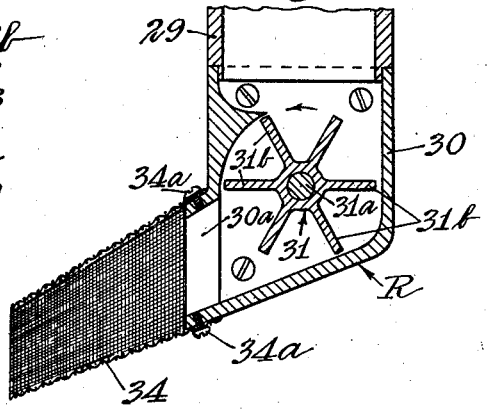
Inventor
Ole Sutter
By Williamson & Williamson
Attorneys Patented Oct. 25, 1938

2,134,216

UNITED STATES PATENT OFFICE 2,134,216

SEED GRADING AND CLEANING APPARATUS

Ole Sutter, Isanti, Minn.

Application August 22, 1936, Serial No. 97,407

3 Claims. (Cl. 209—45)

My invention relates to material separating apparatus and particularly apparatus for separating good seeds from inferior seeds and foreign materials.

When seeds, such as beans or the like, have been graded in accordance with their various sizes, many flat, misshapen, split and otherwise defective seeds and a certain amount of dirt and other foreign material remain with the seeds of each size. Obviously, if a high grade of product is to be obtained, it is necessary to remove as near all of the defective and undesirable seeds and foreign material as possible.

A general object of my invention is to provide particularly effective apparatus for separating defective and undesirable seeds and foreign material from a supply of seeds so as to leave substantially only the good seeds.

Another object is to provide such apparatus adapted to be driven by power means and capable of continuous, substantially automatic operation to deliver good seeds and rejected material to separate receptacles.

Still another object is to provide such apparatus utilizing a current of air for carrying defective seeds out of a stream of seeds so as to leave the good seeds.

A further object is to provide such an apparatus of simple, rugged, compact, light and inexpensive construction.

These and other objects will be more apparent from the following description made in connection with the accompanying drawings wherein like reference characters refer to similar parts throughout the several views, and in which:—

Fig. 1 is a front view of an embodiment of my invention,

Fig. 2 is a partially broken-away top view,

Fig. 3 is a vertical sectional view taken along the line 3—3 of Fig. 2 as indicated by the arrows, Fig. 4 is a partial vertical sectional view taken along the line 4—4 of Fig. 2 as indicated by the arrows and Fig. 5 is a partial vertical sectional view taken along the line 5—5 of Fig. 2 as indicated by the arrows.

Referring to the drawings, the embodiment of my invention illustrated includes suitable supporting and housing means for parts to be described. A platform 6 is provided with legs 7 for supporting the platform 6 from and at the substantial distance above a horizontal surface F such as a floor. A vertical wall 8 is attached to the medial portion of the platform 6 in upwardly projecting transverse relation thereto and vertical side walls 9 and 10 are attached to the platform 6 and the medially located wall 8 so as to extend along the respective longitudinal marginal portions of the platform 6 from the medial wall 8 to the right hand end of the platform 6 as viewed in Figs. 2 and 3. A horizontal wall 11 extends in one direction from one to the other of the side walls 9 and 10 and from the medial wall 8 to a point medially between the ends of the space between the side walls 9 and 10. The walls 8, 9, 10 and 11 function as supporting means for certain parts of my apparatus and comprise a housing H open at the right hand (as viewed in Figs. 2 and 3) end.

An endless member movable in an endless path is provided in the form of a drum D comprising disc-like end members 12 carrying a peripheral portion 13 formed of material pervious to air as, for example, finely woven wire mesh, as shown. Preferably the fine wire mesh peripheral portion 13 of the drum D is re-inforced by placing a layer 14 of relatively coarse wire mesh in underlying relation thereto, both of the wire mesh elements 13 and 14 being secured to the end members 12 of the drum. The above described drum D is mounted on a shaft 15 and the end members 12 are secured to the same. The drum D is placed within the housing H with its axis extending horizontally and transversely of the housing and projecting ends of the drum shaft 15 journalled in bearings 16 carried by the side walls 9 and 10 of the housing H and is spaced substantially equally from the platform 6 and the top wall of the housing H.

Air exhausting means is connected to that portion of the interior of the housing H lying between the drum D and the transverse vertical wall 8 of the housing H. To this end the wall 8 is apertured to form an air outlet port 17. The air intake 18a of a blower 18, mounted on the platform 6, is connected through a duct 19 to the air outlet port 17 of the housing H and the air outlet 18b of the blower 18 is open to the atmosphere so that the blower when in operation, will exhaust or suck air from the portions of the interior of the housing H between the drum H and the transverse wall 8 of the housing H. Power producing means such as the electric motor 20 is directly coupled to the blower 18 to drive the same. The blower 18 may, of course, be of conventional design. The outlet port 17 of the housing H is provided, at the inner side of the wall 8, with a screen 21 secured to the wall 8. For regulating the exhausting of air through the air outlet port 17 a damper comprising a plate 22 is mounted at the inner side of the screen 21 for adjustive vertical sliding movement and is provided with an operating handle 22a disposed above the top wall 11 of the housing H.

The withdrawal of air through the air outlet port 17 will obviously cause a flow of air inwardly through the open right hand (as viewed in Figs. 2 and 3) end of the housing H and from right to left through the interior of the housing to the outlet port 17. Means is provided to so guide this current of air that the greatest portion thereof will flow through the reticulated peripheral portion 13 and interior of the drum D. To this end upper and lower baffle plates 23 and 24 respectively, curved to match the curvature of the peripheral portion 13 of the drum D are placed somewhat to the right (as viewed in Figs. 2 and 3) of positions respectively directly above and below the drum D and are disposed parallel to and spaced a moderate distance outwardly from the periphery of the drum D as shown. The sides of the baffles 23 and 24 are provided with outwardly projecting flanges 23a and 24a and are each so supported as to be adjustively movable in directions extending circumferentially of the drum D. Strips 23b and 24b, slightly less in length than the width of the interior of the housing H and extending transversely of the housing H are secured respectively to the upper wall 11 of the housing H and the platform 6 substantially in vertical alignment with the axis of the drum D. The baffles 23 and 24 are positioned with their outer sides against the strips 23b and 24b and their flanges 23a and 24a engaging the ends of the respective strips 23b and 24b. Rods 23c and 24c, suitably supported at their respective ends from the side walls 9 and 10 of the housing H, extend parallel to the strips 23b and 24b closely adjacent the inner sides of the respective baffles 23 and 24. The baffles 23 and 24 are supported and guided by the rods 23c and 24c and the strips 23b and 24b in such manner as to permit adjustive movement of the baffles in directions extending circumferentially of the drum D. Thumb-nuts 23d and 24d, working on studs secured in the walls 9 and 10 of the housing H, are positioned and arranged to function as releasable clamping means for gripping the marginal portions of the respective baffle flanges 23a and 24a so as to normally secure the baffles 23 and 24 in desired adjusted positions.

Means is provided for rotating the drum D in a counterclockwise direction as viewed in Fig. 3. For this purpose a pulley 25 on the drum shaft 15 is connected through a belt 26 to a pulley 27 on the shaft 20a of the motor 20 so that the drum D will be rotated in a counterclockwise direction by the motor 20. A second pulley 28 is also mounted on the drum shaft 15 to be rotated therewith and for a purpose to be described.

Means is provided for subjecting seeds to be separated to the current of air flowing inwardly toward and through the right hand or ascending side of the reticulated peripheral portion 13 of the drum D. A hopper 29 is mounted above the right hand end of the housing H, as viewed in Fig. 3 and a rotary seed delivering device is mounted on the inner side of the side wall 9 of the housing H below the hopper 29 with its inlet in communication with the lower end of the hopper 29. The seed delivering device R, as shown in Fig. 5, consists of a casing 30 fitting with but slight clearance about a vaned rotary impeller 31 and having its upper end open to comprise an inlet from the hopper 29. An outlet element 30a is formed in the lower left hand (as viewed in Figs. 3 and 5) portion of the casing 30 to comprise an exit for seeds discharged from the impeller 31. The impeller 31 is mounted on a horizontal shaft 31a journalled in suitable apertures in the casing 30 and is adapted to be rotated, preferably in a counterclockwise direction (as viewed in Figs. 3 and 5), whereby seeds from the hopper 29 will drop into the upwardly opening pockets defined by the vanes 31b of the upper portion of the impeller 31, will travel with the vanes 31b and will be dropped from said pockets as the same reach downwardly opening positions. Obviously the dropped seeds will travel by gravity down the inclined lower wall of the casing 30 and out of the outlet element 30a.

Means is provided for rotating the impeller 31 in a counterclockwise direction. A pulley 32, mounted on the impeller shaft 31a is connected by means of a belt 33 to the previously described pulley 28 which is mounted on and rotates with the drum shaft 15.

A spout 34, formed preferably of reticulated material such as relatively fine wire mesh, is attached to the outlet element 30a of the seed delivering device R by suitable means such as the screws 34a. The spout 34 extends toward the drum D closely adjacent the wall 9 of the housing H and is of such length that its open outer end is disposed a relatively short distance outwardly of the peripheral portion 13 of the drum D.

A relatively narrow platform 35, preferably formed of reticulated material such as relatively fine wire mesh, is disposed immediately outwardly of the right hand (as viewed in Figs. 2 and 3) or ascending side of the reticulated peripheral portion 13 of the drum with its length generally parallel to the axis of the drum D and its width generally horizontal. The platform extends from immediately adjacent the side wall 9 of the housing H under the open end of the spout 34 to a point a short distance inwardly of the side wall 10 of the housing H. The longitudinal edges of the platform are re-inforced by members 35a and 35b which extend from wall 9 to wall 10 of the housing H and are integrally connected to vertically upwardly extending, vertically slotted platform supporting plates 35c lying flat against the inner sides of the respective side walls 9 and 10. The slotted plates 35c are anchored to the walls 9 and 10 by thumbnuts 36 working on screw-threaded studs anchored in the respective side walls 9 and 10 and extending through the slotted portions of the plates 35c. Loosening of the thumbnuts 36 obviously releases the platform 35 for adjusting the position thereof. The platform 35 is normally positioned with the edge thereof, nearest the drum D only very slightly spaced from the peripheral portion 13 of the drum D and with the plane of the platform 35 sloping to a moderate degree from the wall 9 toward the wall 10 and also sloping slightly toward the drum D whereby seeds will tend to roll down the length of the platform 35 relatively near the peripheral portion of the drum D and drop through the opening defined by the reinforcing members 35a, the wall 10 and the lowermost end of the platform 35. A chute 37 is secured to the wall 10 with its upper end positioned to receive seeds dropping through the above described opening and its lower end positioned to deliver the received seeds into a receptacle 38 placed therebeneath.

The left hand (as viewed in Figs. 2 and 3) end of the portion of the platform 6 above which the housing H extends is cut away and a chute 39 is connected at its upper end to the opening thus formed and arranged for discharge of material from its lower end into a receptacle 40 placed therebeneath.

In normal operation of my seed separating apparatus the motor 20 is of course energized so that it will rotate the drum D and the impeller 31 of the seed delivering device R in a counterclockwise direction as viewed in Fig. 3 and drive the suction blower 18. Referring to Fig. 3, operation of the blower 18 will cause a current of air to enter the open right hand end of the housing H, pass between the baffles 23 and 24 and through the ascending portion of the reticulated peripheral portion of the drum D, pass out of the drum D through the descending part of the reticulated peripheral portion 13 thereof and pass from the housing H into the intake port 18a of the blower 18 through the screen 21 and the duct 19. The air current referred to obviously passes over the inclined platform 35 toward the drum D and into the interior of the drum D through the interstices of the ascending reticulated peripheral portion 13 of the drum D so as to produce suction at said interstices tending to hold objects against the ascending part of the drum periphery.

Seeds to be separated are placed in the hopper 29 and are fed therefrom onto the uppermost end of the inclined platform 35 by means of the seed delivering device R and the spout 34 whereafter the seeds start moving down the slope of the platform 35 toward the side wall 10 of the housing H. Seeds so moving along the platform 35 are of course subjected to the air current referred to above.

It has been found that plump, sound and roundingly shaped seeds have greater weight relative to the area presented thereby to a current of air than misshapen, defective and poorly shaped seeds. This characteristic is taken advantage of in separating the undesirable seeds from the desirable seeds in my apparatus. With the previously described air current in my machine flowing at a suitable velocity, the undesirable seeds which, as explained above, are the lighter ones, will be carried by the air current toward the drum D whereas the desirable seeds are heavy enough to continue their journey down the slope of the platform 35, through the chute 37 and into the receptacle 38. The lighter seeds, and incidentally most foreign material such as pieces of stalks and leaves, are sucked against the ascending side of the peripheral portion 13 of the drum D and will ascend therewith. The holding of such seeds on the drum periphery by means of suction will continue until the seeds are at the upper portion of the path of the drum periphery whereat, due to the upper baffle 23, the air current tends to flow parallel to the drum periphery between the same and the baffle 23 instead of radially inwardly of the drum D. Since the portion of the drum periphery at this point in its path is disposed substantially horizontally, gravity will act to hold the seeds on the drum in the leftwardly (as viewed in Fig. 3) moving portion of the path of travel of the seeds. Also, air flowing between the drum D and the upper baffle 23 will assist in moving the seeds leftwardly with the upper portion of the drum D. As the portion of the drum D on which the seeds are disposed enters the descending portions of its path the seeds will drop from the drum through the chute 39 into the receptacle 40. Air moving outwardly of the drum at the descending part of the path of the drum periphery tends to push seeds and other material from the drum periphery.

From the above it should be readily understood how my machine separates the desirable and undesirable seeds and deposits them respectively in the receptacles 38 and 40.

Adjustability of the baffles 23 and 24 and the platform 35 as to the positions thereof and regulation of the air current by means of the damper 22 make possible the attainment of operating conditions affording relatively accurate separating action. Placing of the baffles 23 and 24, at the edges thereof nearest the platform 35, at different distances apart acts to supplement the air current regulation obtainable by means of the damper 22.

It has been found desirable to grade seeds according to size before putting them through my machine so that all of the seeds placed in my machine during a run will have similar maximum dimensions.

I am aware that my machine is not limited to use in separating seeds only but is also well adapted for use in separating the lighter and heavier ones of many other types of objects.

It is apparent that I have invented a novel, light, compact and inexpensive type of seed separating apparatus capable of automatically, rapidly and accurately separating good seeds and poor seeds.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. Apparatus for separating solid objects of differing specific gravities comprising, a reticulated element disposed and movable generally vertically, means for moving said element in a generally upward direction, means for moving air through the interstices of said element, and means for moving objects to be separated along a generally horizontal path extending past the windward side of said element closely adjacent and substantially parallel thereto whereby the lighter of said objects will be blown against and carried with said element and the heavier of said objects will continue in said path.

2. Apparatus for separating solid objects of differing specific gravities comprising, a hollow drum having its longitudinal axis substantially horizontally disposed and being mounted for rotation about said axis, means for rotating said drum, the peripheral portion of said drum being formed of reticulated material, means for moving air inwardly through the interstices of the ascending side of said peripheral portion, a platform disposed closely adjacent the exterior of the ascending side of said drum and extending in a generally horizontal direction generally parallel to the axis of rotation of said drum, and means for progressing objects to be separated along said platform in a direction substantially parallel to the axis of the drum whereby the lighter of said objects will be sucked against and will move with said peripheral portion and the heavier of said objects will continue along said platform.

3. Apparatus for separating solid objects of differing specific gravities comprising, a hollow drum having its longitudinal axis substantially horizontally disposed and being mounted for rotation about said axis, means for rotating said drum, the peripheral portion of said drum being formed of reticulated material, means for moving air inwardly through the interstices of the ascending side of said peripheral portion, a platform disposed closely adjacent said ascending side and being generally parallel to the rotational axis of said drum and inclined slightly from one end of the drum to the other so that objects placed on the higher end of said platform will progress toward the lower end thereof responsive to gravity whereby the lighter of said objects will be sucked against and will move with said peripheral portion and the heavier of said objects will continue along said platform, and means for delivering objects to be separated onto the higher end of said platform at a substantially uniform predetermined rate.

OLE SUTTER.